(12) United States Patent
van der Bos et al.

(10) Patent No.: US 7,909,576 B1
(45) Date of Patent: Mar. 22, 2011

(54) FASTENING DEVICE FOR ROTOR BLADE COMPONENT

(75) Inventors: Roelant van der Bos, Ibbenbueren (DE); Andreas G. W. Starke, Rheine (DE)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 12/822,626

(22) Filed: Jun. 24, 2010

(51) Int. Cl.
*F03D 11/00* (2006.01)

(52) U.S. Cl. ............... 416/146 R; 416/228; 416/235; 416/236 R (58) Field of Classification Search ......... 416/146 R, 416/228, 235, 236 R
See application file for complete search history.

(56) References Cited

U.S. PATENT DOCUMENTS

| | | | | |
|---|---|---|---|---|
| 4,089,618 A | * | 5/1978 | Patel | 416/228 |
| 5,088,665 A | * | 2/1992 | Vijgen et al. | 244/200 |
| 5,533,865 A | * | 7/1996 | Dassen et al. | 416/228 |
| 6,830,436 B2 | * | 12/2004 | Shibata et al. | 416/228 |
| 7,059,833 B2 | | 6/2006 | Stiesdal et al. | |
| 2003/0715121 | | 9/2003 | Shibata et al. | |

* cited by examiner

*Primary Examiner* — Ninh H Nguyen
(74) *Attorney, Agent, or Firm* — Dority & Manning, P.A.

(57) ABSTRACT

A rotor blade assembly is disclosed. The rotor blade assembly includes a rotor blade having a pressure side, a suction side, a leading edge, and a trailing edge extending between a tip and a root. The rotor blade assembly further includes a rotor blade component, and a fastening device for fastening the rotor blade component to the rotor blade, the fastening device comprising at least one button associated with one of the rotor blade or the rotor blade component and at least one mating groove associated with the other of the rotor blade or the rotor blade component, wherein the at least one button and the at least one mating groove are configured to fasten the rotor blade component to the rotor blade.

20 Claims, 7 Drawing Sheets

FASTENING DEVICE FOR ROTOR BLADE COMPONENT

FIELD OF THE INVENTION

The present disclosure relates in general to wind turbine rotor blades, and more particularly to fastening devices for fastening rotor blade components to rotor blades.

BACKGROUND OF THE INVENTION

Wind power is considered one of the cleanest, most environmentally friendly energy sources presently available, and wind turbines have gained increased attention in this regard. A modern wind turbine typically includes a tower, generator, gearbox, nacelle, and one or more rotor blades. The rotor blades capture kinetic energy of wind using known foil principles. The rotor blades transmit the kinetic energy in the form of rotational energy so as to turn a shaft coupling the rotor blades to a gearbox, or if a gearbox is not used, directly to the generator. The generator then converts the mechanical energy to electrical energy that may be deployed to a utility grid.

In many cases, various components are attached to the rotor blades of wind turbines to perform various functions during operation of the wind turbines. For example, noise reducers may be attached to the trailing edges of rotor blades to reduce the aerodynamic noise emissions from the rotor blades. However, typical noise reducers and other various components are generally difficult to attach to the rotor blades, requiring, for example, significant modifications to both the pressure side and suction side of the rotor blades. These modifications may be expensive and time-consuming, and may disrupt the aerodynamic profiles of the rotor blades. Additionally, various known attachment solutions prevent the components from being quickly and efficiently attached to and removed from the rotor blades as required by, for example, environmental conditions. Further, many of the components may be relatively rigid, preventing the components from conforming to the aerodynamic profiles of the rotor blades.

Thus, a fastening device for rotor blade components that allows the components to be quickly and efficiently attached to and removed from the rotor blades would be desired. Further, a fastening device that minimizes any disruption of the aerodynamic profiles of the rotor blades would be advantageous. Additionally, a rotor blade component that can conform to the aerodynamic profile of a rotor blade would be desired.

BRIEF DESCRIPTION OF THE INVENTION

Aspects and advantages of the invention will be set forth in part in the following description, or may be obvious from the description, or may be learned through practice of the invention.

In one embodiment, a rotor blade assembly is disclosed. The rotor blade assembly includes a rotor blade having a pressure side, a suction side, a leading edge, and a trailing edge extending between a tip and a root. The rotor blade assembly further includes a rotor blade component, and a fastening device for fastening the rotor blade component to the rotor blade, the fastening device comprising at least one button associated with one of the rotor blade or the rotor blade component and at least one mating groove associated with the other of the rotor blade or the rotor blade component, wherein the at least one button and the at least one mating groove are configured to fasten the rotor blade component to the rotor blade.

In another embodiment, a rotor blade assembly is disclosed. The rotor blade assembly includes a rotor blade having a pressure side, a suction side, a leading edge, and a trailing edge extending between a tip and a root, the rotor blade further having an aerodynamic profile. The rotor blade assembly further includes a noise reducer fastened to the rotor blade adjacent the trailing edge, the noise reducer including a plurality of projections, the projections spaced apart from each other and defining a plurality of indentations therebetween, each of the plurality of indentations including a contouring notch, the contouring notches allowing the noise reducer to have an aerodynamic profile that corresponds to the aerodynamic profile of the rotor blade.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which.

DETAILED DESCRIPTION OF THE INVENTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

Figure 1:
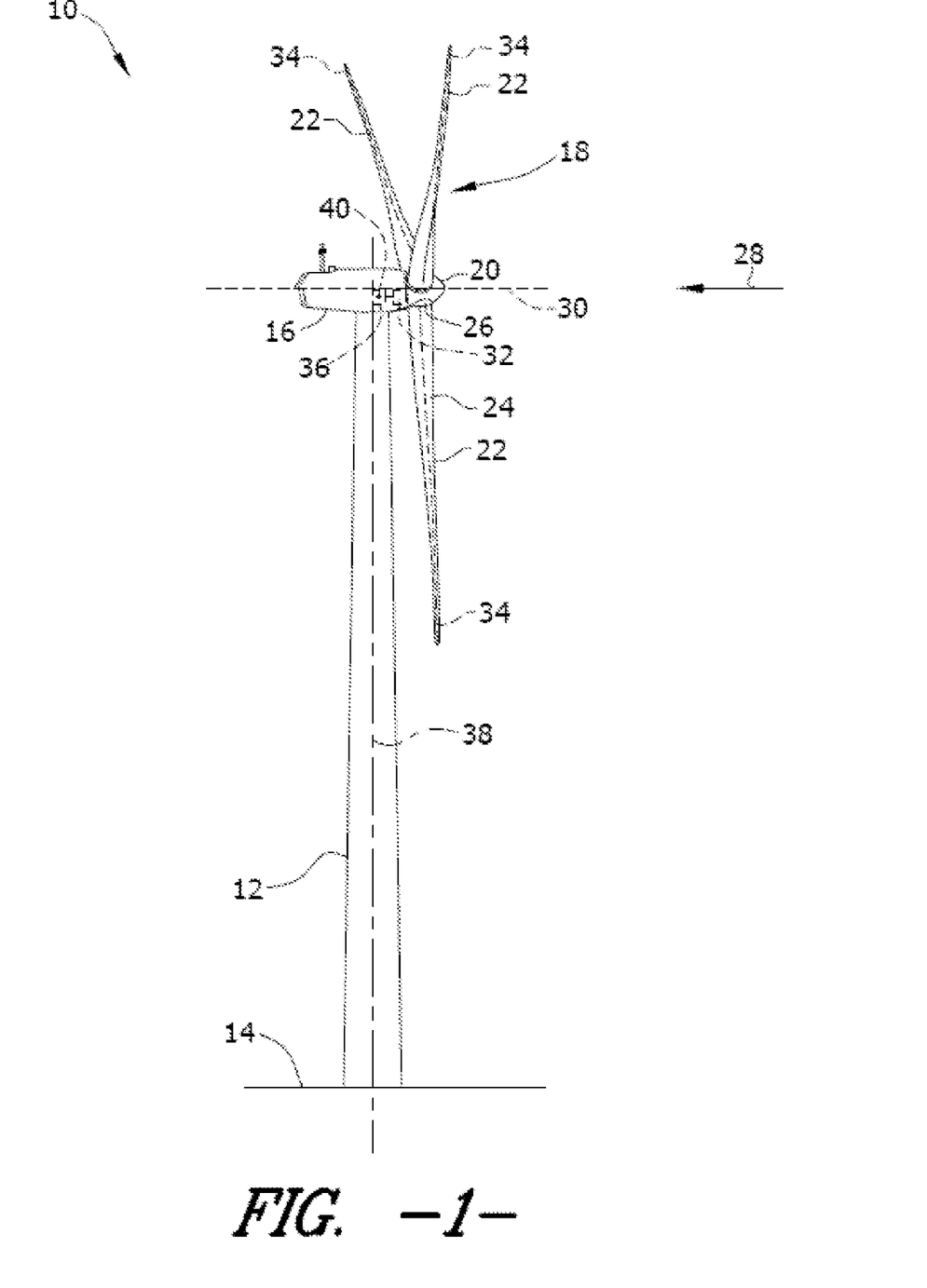
FIG. 1 is a perspective view of one embodiment of a wind turbine of the present disclosure.

FIG. 1 is a perspective view of an exemplary wind turbine 10. In the exemplary embodiment, wind turbine 10 is a horizontal-axis wind turbine. Alternatively, wind turbine 10 may be a vertical-axis wind turbine. In the exemplary embodiment, wind turbine 10 includes a tower 12 that extends from a support surface 14, a nacelle 16 mounted on tower 12, and a rotor 18 that is coupled to nacelle 16. Rotor 18 includes a rotatable hub 20 and at least one rotor blade 22 coupled to and extending outward from hub 20. In the exemplary embodiment, rotor 18 has three rotor blades 22. In an alternative embodiment, rotor 18 includes more or less than three rotor blades 22. In the exemplary embodiment, tower 12 is fabricated from tubular steel to define a cavity (not shown in FIG. 1) between support surface 14 and nacelle 16. In an alternative embodiment, tower 12 is any suitable type of tower having any suitable height.

Rotor blades 22 are spaced about hub 20 to facilitate rotating rotor 18 to enable kinetic energy to be transferred from the wind into usable mechanical energy, and subsequently, electrical energy. Rotor blades 22 are mated to hub 20 by coupling a blade root portion 24 to hub 20 at a plurality of load transfer regions 26. Load transfer regions 26 have a hub load transfer region and a blade load transfer region (both not shown in FIG. 1). Loads induced to rotor blades 22 are transferred to hub 20 via load transfer regions 26. In one embodiment, rotor blades 22 have a length ranging from about 15 meters (m) to about 91 m. Alternatively, rotor blades 22 may have any suitable length that enables wind turbine 10 to function as described herein. For example, other non-limiting examples of blade lengths include 10 m or less, 20 m, 37 m, or a length that is greater than 91 m. As wind strikes rotor blades 22 from a direction 28, rotor 18 is rotated about an axis of rotation 30. As rotor blades 22 are rotated and subjected to centrifugal forces, rotor blades 22 are also subjected to various forces and moments. As such, rotor blades 22 may deflect and/or rotate from a neutral, or non-deflected, position to a deflected position. Moreover, a pitch angle or blade pitch of rotor blades 22, i.e., an angle that determines a perspective of rotor blades 22 with respect to direction 28 of the wind, may be changed by a pitch adjustment system 32 to control the load and power generated by wind turbine 10 by adjusting an angular position of at least one rotor blade 22 relative to wind vectors. Pitch axes 34 for rotor blades 22 are shown. During operation of wind turbine 10, pitch adjustment system 32 may change a blade pitch of rotor blades 22 such that rotor blades 22 are moved to a feathered position, such that the perspective of at least one rotor blade 22 relative to wind vectors provides a minimal surface area of rotor blade 22 to be oriented towards the wind vectors, which facilitates reducing a rotational speed of rotor 18 and/or facilitates a stall of rotor 18.

In the exemplary embodiment, a blade pitch of each rotor blade 22 is controlled individually by a control system 36. Alternatively, the blade pitch for all rotor blades 22 may be controlled simultaneously by control system 36. Further, in the exemplary embodiment, as direction 28 changes, a yaw direction of nacelle 16 may be controlled about a yaw axis 38 to position rotor blades 22 with respect to direction 28.

In the exemplary embodiment, control system 36 is shown as being centralized within nacelle 16, however, control system 36 may be a distributed system throughout wind turbine 10, on support surface 14, within a wind farm, and/or at a remote control center. Control system 36 includes a processor 40 configured to perform the methods and/or steps described herein. Further, many of the other components described herein include a processor. As used herein, the term "processor" is not limited to integrated circuits referred to in the art as a computer, but broadly refers to a controller, a microcontroller, a microcomputer, a programmable logic controller (PLC), an application specific integrated circuit, and other programmable circuits, and these terms are used interchangeably herein. It should be understood that a processor and/or a control system can also include memory, input channels, and/or output channels.

Figure 2:
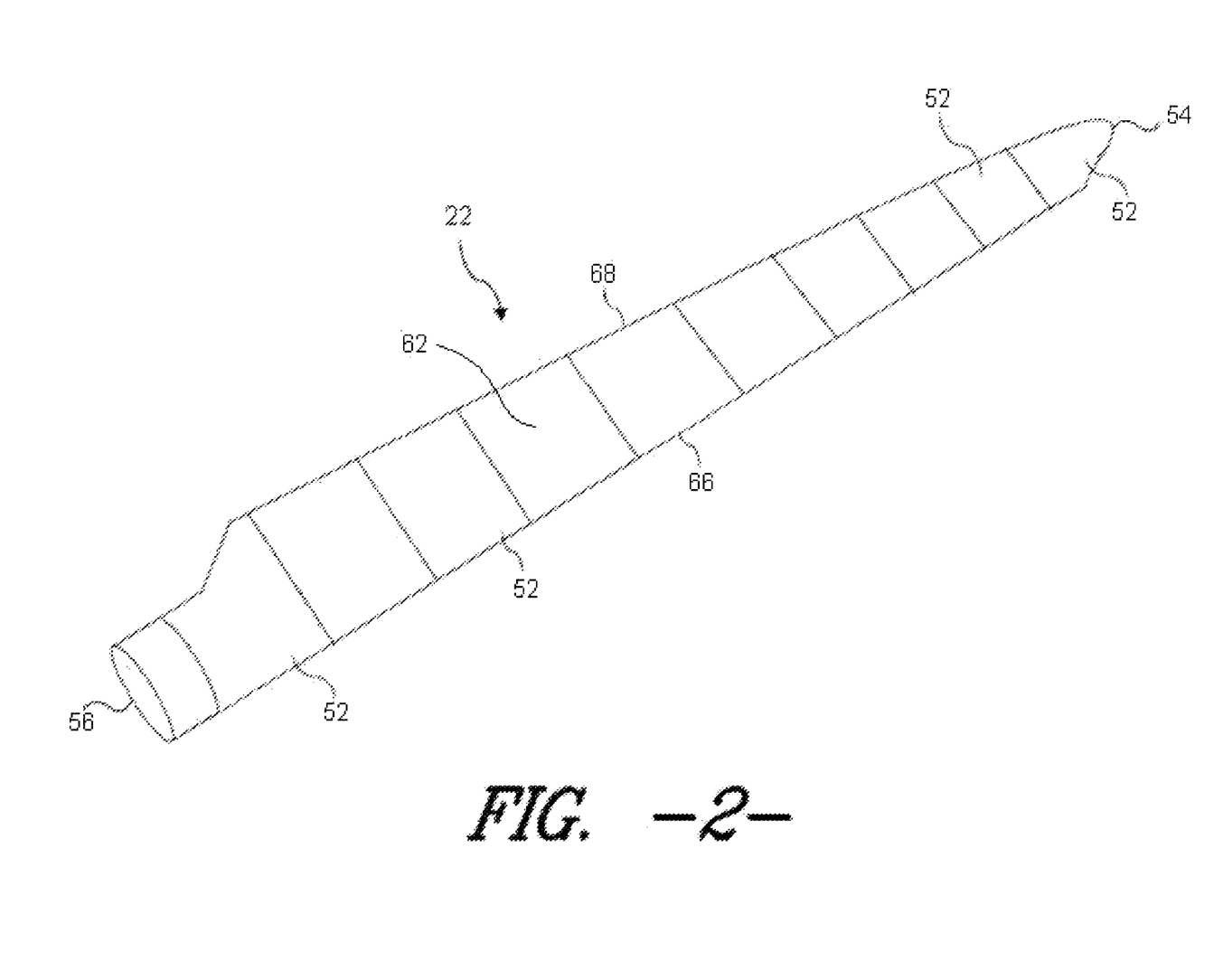
FIG. 2 is a perspective view of one embodiment of a rotor blade of the present disclosure.

Referring to FIG. 2, a rotor blade 22 in accordance with aspects of the present disclosure is illustrated. The rotor blade 22, in one embodiment, may include a plurality of individual blade segments 52 aligned in an end-to-end order from a blade tip 54 to a blade root 56. Each of the individual blade segments 52 is uniquely configured so that the plurality of blade segments 52 define a complete rotor blade 22 having a designed aerodynamic profile, length, and other desired characteristics. For example, each of the blade segments 52 may have an aerodynamic profile that corresponds to the aerodynamic profile of adjacent blade segments 52. Thus, the aerodynamic profiles of the blade segments 52 form a continuous aerodynamic profile of the rotor blade 22. Alternatively, the rotor blade 22 may be formed as a singular, unitary blade having the designed aerodynamic profile, length, and other desired characteristics. In an exemplary embodiment, the complete rotor blade 22 may have a swept shape giving it a curved contoured aerodynamic profile running from the distal end to the proximal end of the rotor blade 22. In an alternative embodiment, the rotor blade 22 may have a non-swept shape and respective aerodynamic profile. Further, the rotor blade 22 may include a pressure side 62 and a suction side 64 extending between a leading edge 66 and a trailing edge 68.

Referring now to FIGS. 3 through 10, a rotor blade assembly 100 of the present disclosure is shown. The rotor blade assembly 100 may include, for example, a rotor blade 22 and a rotor blade component 110 fastened to the rotor blade 22. The rotor blade component 110 may be configured to perform any variety of functions. For example, in an exemplary embodiment, the rotor blade component 110 may be a noise reducer 110. The noise reducer 110 may reduce the aerodynamic noise being emitted from the rotor blade 22 during operation of the wind turbine 10. Alternatively, the rotor blade component 110 may be, for example, a lightning receptor, a fairing, a vortex generator panel, a boundary layer turbulator, or any other component that may be fastened to the rotor blade 22 of a wind turbine 10.

In an exemplary embodiment of the present disclosure, the rotor blade component 110 may be fastened to the rotor blade 22 adjacent the trailing edge 68 of the rotor blade 22. Alternatively, the rotor blade component 110 may be fastened to the rotor blade 22 adjacent the leading edge 66 of the rotor blade 22, or adjacent the tip 54 or the root 56 of the rotor blade 22, or at any other suitable position on the rotor blade 22. Further, the rotor blade component 110 may be disposed on the pressure side 62 of the rotor blade 22, or on the suction side 64 of the rotor blade, as discussed below. Advantageously, the rotor blade component 110 may be disposed on and fastened to the rotor blade 22 only on the pressure side 62 or the suction side 64, so as to not interrupt the aerodynamic profile of the rotor blade 22 on the other side.

As discussed above, in an exemplary embodiment, the rotor blade component 110 may be a noise reducer 110. The noise reducer 110 may include, for example, a plurality of projections 112. The plurality of projections 112 may be spaced apart from each other, defining a plurality of indentations 114 therebetween. The projections 112 and indentations 114 may be generally V-shaped or U-shaped, or may have any other shape or configuration suitable for reducing the noise being emitted from the rotor blade 22 during operation of the wind turbine 10. Further, in exemplary embodiments the projections 112 and indentations 114 may form serrated edges, as is understood in the art.

The noise reducer 110 may further define a plurality of contouring notches 116. For example, each of the indentations 114, or a portion of the indentations 114, may include a contouring notch 116. Alternatively, the contouring notches 116 may be separate from the indentations 114. The contouring notches 116 may allow the noise reducer 110 to have an aerodynamic profile that corresponds to the aerodynamic profile of the rotor blade 22. For example, the contouring notches 116 may reduce the surface area of the noise reducer 110, thus reducing stresses in the noise reducer 110 and allowing the noise reducer to more easily bend while maintaining suitable stiffness and rigidity. Thus, the contouring notches 116 may allow the noise reducer 110 to bend and match the contours of the aerodynamic profile of the rotor blade 22.

The contouring notches 116 may have any suitable shape and size. For example, the contouring notches may be generally circular or oval-shaped, or may be rectangular, triangular, diamond-shaped, or may have any suitable polygonal shape.

It should be understood that the contouring notches 116 of the present disclosure are not limited to applications on noise reducers 110, but may be defined in any rotor blade component 110 to allow the rotor blade component 110 to better bend and contour to correspond to the aerodynamic profile of the rotor blade 22.

In general and as discussed below, the rotor blade component 110 may be mechanically fastened to the rotor blade 22, such that, for example, an adhesive is not required for fastening.

The rotor blade assembly 100 of the present disclosure may further include, for example, a fastening device 120. The fastening device 120 may be configured to fasten the rotor blade component 110 to the rotor blade 22. For example, the fastening device 120 may include at least one button 122, or a plurality of buttons 122, and at least one mating groove 124, or a plurality of mating grooves 124.

It should be understood that the fastening device 120 of the present disclosure is not limited to applications on a rotor blade assembly 100. For example, the fastening device could be utilized to attach various components to any portion of the wind turbine 10, such as to the tower 12, the nacelle 16, or the hub 20.

The buttons 122 and mating grooves 124 may be configured to fasten the rotor blade component 110 to the rotor blade 22. For example, the buttons 122 may each include a head 126 and a stem 128. In exemplary embodiments, the perimeter of the head 126 may be greater than the perimeter of the stem 128. Alternatively, however, the perimeter of the head 126 may be smaller than the perimeter of the stem 128, or the perimeters of the head 126 and stem 128 may be approximately equal. The head 126 and stem 128 may each have any suitable shape and size. For example, the head 126 and stem 128 may be generally circular or oval-shaped, or may be rectangular, triangular, diamond-shaped, or may have any suitable polygonal shape.

In general, the buttons 122 may be associated with one of the rotor blade 22 or the rotor blade component 110, while the mating grooves 124 may be associated with the other of the rotor blade 22 or rotor blade component 110. As shown in FIGS. 3 through 8, in an exemplary embodiment, the buttons 122 may be disposed on the rotor blade 22, while the mating grooves 124 are defined in the rotor blade component 110. In exemplary embodiments, the buttons 122 may be disposed adjacent the trailing edge 68 of the rotor blade 22. As shown in FIGS. 3 through 8, for example, the buttons 122 may be spaced from each other and aligned along the trailing edge 68 of the rotor blade 22. Alternatively, the buttons 122 may be disposed adjacent the leading edge 66 of the rotor blade 22, or adjacent the tip 54 or the root 56 of the rotor blade 22, or at any other suitable position on the rotor blade 22. It should be understood that the buttons 122 need not be aligned as shown in FIGS. 3 through 8, but may be disposed along the trailing edge 68 in any suitable pattern and having any suitable spacing. Further, it should be understood that the mating grooves 124 defined in the rotor blade component 110 may have a pattern and spacing corresponding to the pattern and spacing of the buttons 122.

In further exemplary embodiments, the buttons 122 may be disposed on the pressure side 62 of the rotor blade 22. For example, as shown in FIGS. 3 through 8, the buttons 122 may be disposed adjacent the trailing edge 68 and on the pressure side 62 of the rotor blade 22. Alternatively, the buttons 122 may be disposed on the suction side 64 of the rotor blade 22. For example, the buttons 122 may be disposed adjacent the trailing edge 68 and on the suction side 64 of the rotor blade 22. Further, it should be understood that the buttons 122 may be disposed on the pressure side 62 or the suction side 64 adjacent to any location on the rotor blade 22, including the leading edge 66, the tip 54, the root 56, or any other suitable position on the rotor blade 22.

Advantageously, because the buttons 122 need only be disposed on one of the pressure side 62 or the suction side 64, the other side of the rotor blade 22 need not be modified. For example, in the embodiments as shown in FIGS. 3 through 8, the suction side 64 of the rotor blade 22 need not be modified. Alternatively, in embodiments where the buttons 122 are disposed on the suction side 64 of the rotor blade 22, the pressure side 62 need not be modified. Thus, because one of the pressure side 62 or suction side 64 need not be modified, the aerodynamic profile of the rotor blade 22 on this side is not disrupted.

Figure 9:
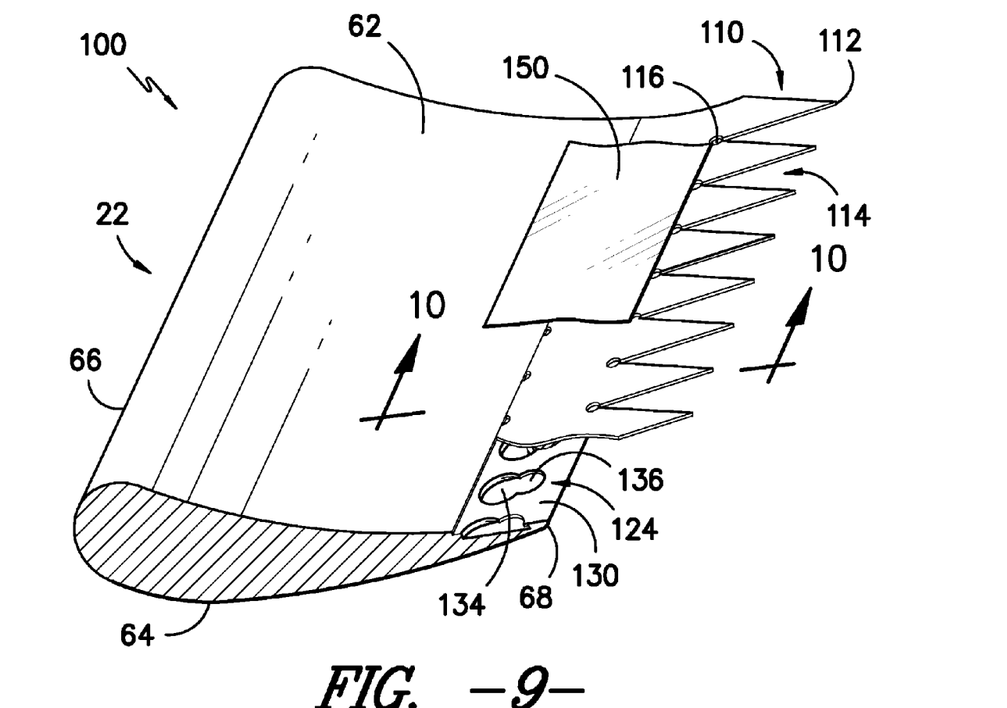
FIG. 9 is a perspective view of a portion of a rotor blade, fastening device, and rotor blade component according to yet another embodiment of the present disclosure; and, FIG. 10 is an exploded cross-sectional view of a rotor blade, fastening device, and rotor blade component along the line 10-10 of FIG. 9 according to yet another embodiment of the present disclosure.
Figure 10:
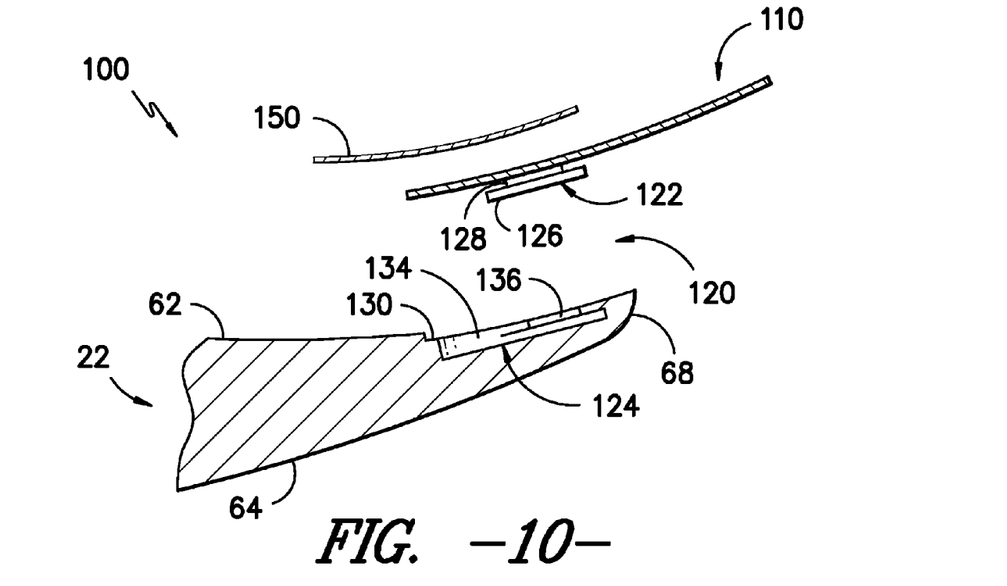

As shown in FIGS. 9 and 10, in alternative exemplary embodiments, the buttons 122 may be disposed on the rotor blade component 110, while the mating grooves 124 are defined in the rotor blade 22. In exemplary embodiments, the mating grooves 124 may be defined adjacent the trailing edge 68 of the rotor blade 22. As shown in FIGS. 9 and 10, for example, the mating grooves 124 may be spaced from each other and aligned along the trailing edge 68 of the rotor blade 22. Alternatively, the mating grooves 124 may be defined adjacent the leading edge 66 of the rotor blade 22, or adjacent the tip 54 or the root 56 of the rotor blade 22, or at any other suitable position on the rotor blade 22. It should be understood that the mating grooves 124 need not be aligned as shown in FIGS. 9 through 10, but may be defined along the trailing edge 68 in any suitable pattern and having any suitable spacing. Further, it should be understood that the buttons 122 disposed on the rotor blade component 110 may have a pattern and spacing corresponding to the pattern and spacing of the mating grooves 124.

In further exemplary embodiments, the mating grooves 124 may be defined in the pressure side 62 of the rotor blade 22. For example, as shown in FIGS. 9 and 10, the mating grooves 124 may be defined adjacent the trailing edge 68 and in the pressure side 62 of the rotor blade 22. Alternatively, the mating grooves 124 may be defined in the suction side 64 of the rotor blade 22. For example, the mating grooves 124 may be defined adjacent the trailing edge 68 and in the suction side 64 of the rotor blade 22. Further, it should be understood that the mating grooves 124 may be defined in the pressure side 62 or the suction side 64 adjacent to any location on the rotor blade 22, including the leading edge 66, the tip 54, the root 56, or any other suitable position on the rotor blade 22.

Advantageously, because the mating grooves 124 need only be defined in one of the pressure side 62 or the suction side 64, the other side of the rotor blade 22 need not be modified. For example, in the embodiments as shown in FIGS. 9 and 10, the suction side 64 of the rotor blade 22 need not be modified. Alternatively, in embodiments where the mating grooves 124 are defined on the suction side 64 of the rotor blade 22, the pressure side 62 need not be modified. Thus, because one of the pressure side 62 or suction side 64 need not be modified, the aerodynamic profile of the rotor blade 22 on this side is not disrupted.

The rotor blade 22 may further define a cutaway mounting surface 130, as shown in FIGS. 3 through 10. The cutaway mounting surface 130 may be defined in the pressure side 62 or suction side 64 and adjacent the trailing edge 68, leading edge 66, tip 54, root 56, or any other suitable position on the rotor blade 22. In exemplary embodiments, as shown in FIGS. 3 through 8, the buttons 122 may be disposed on the cutaway mounting surface 130. In alternative exemplary embodiments, as shown in FIGS. 9 and 10, the mating grooves 124 may be defined in the cutaway mounting surface 130. The cutaway mounting surface 130 may generally provide a mounting surface for the fastening device 120 and rotor blade component 110 that has a relatively low profile, so as to minimize any aerodynamic distortion to the rotor blade 22 caused by the fastening device 120 and rotor blade component 110.

Figure 3:
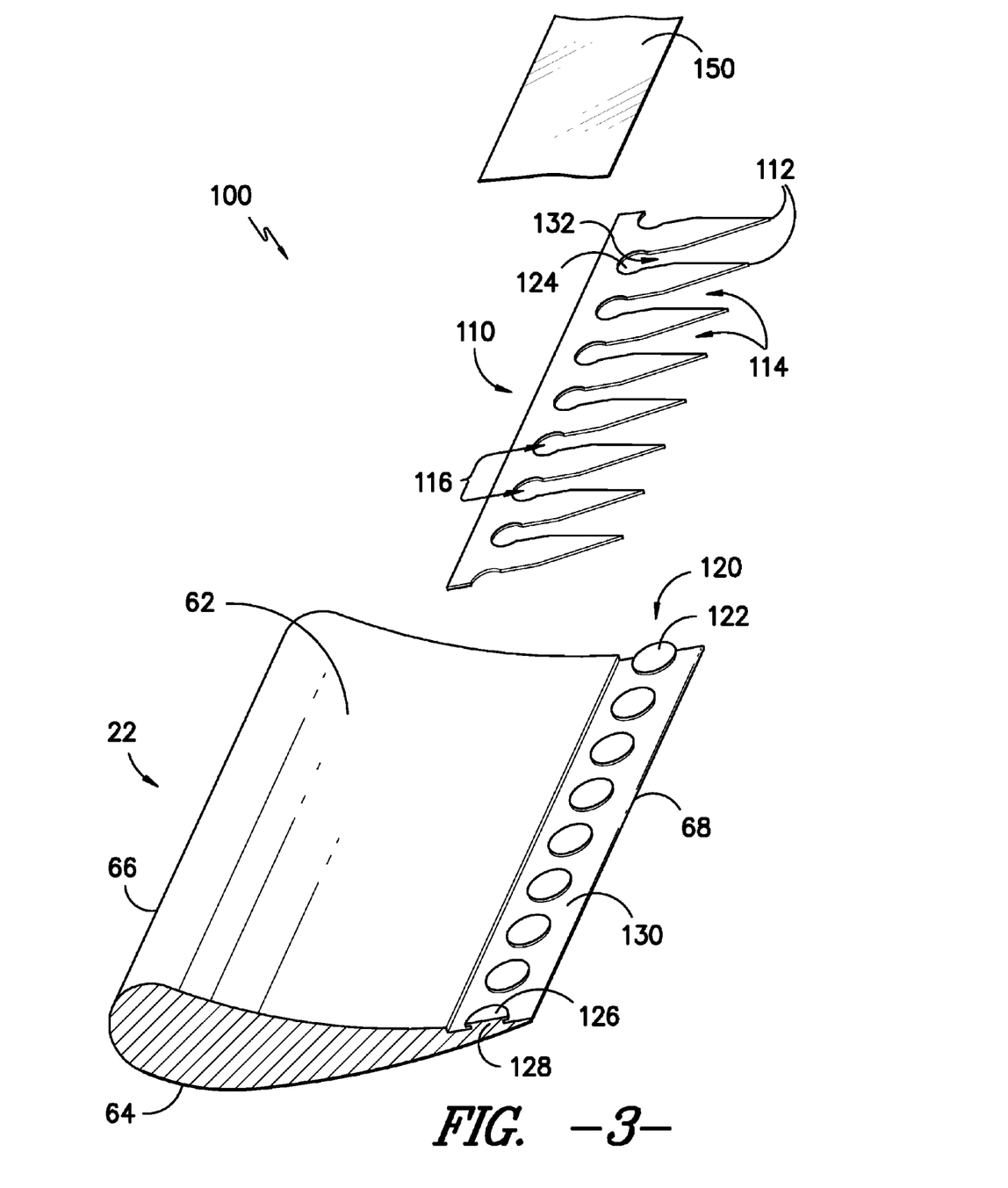
FIG. 3 is an exploded perspective view of a portion of a rotor blade, fastening device, and rotor blade component according to one embodiment of the present disclosure.
Figure 4:
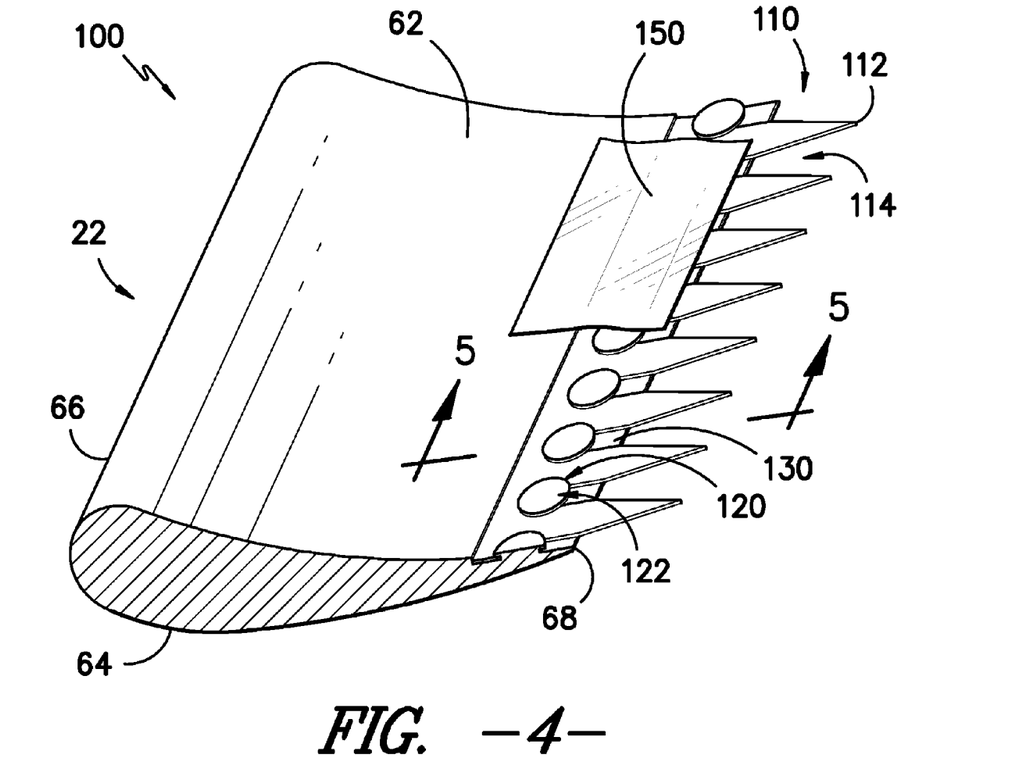
FIG. 4 is a perspective view of a portion of a rotor blade, fastening device, and rotor blade component according to one embodiment of the present disclosure.
Figure 5:
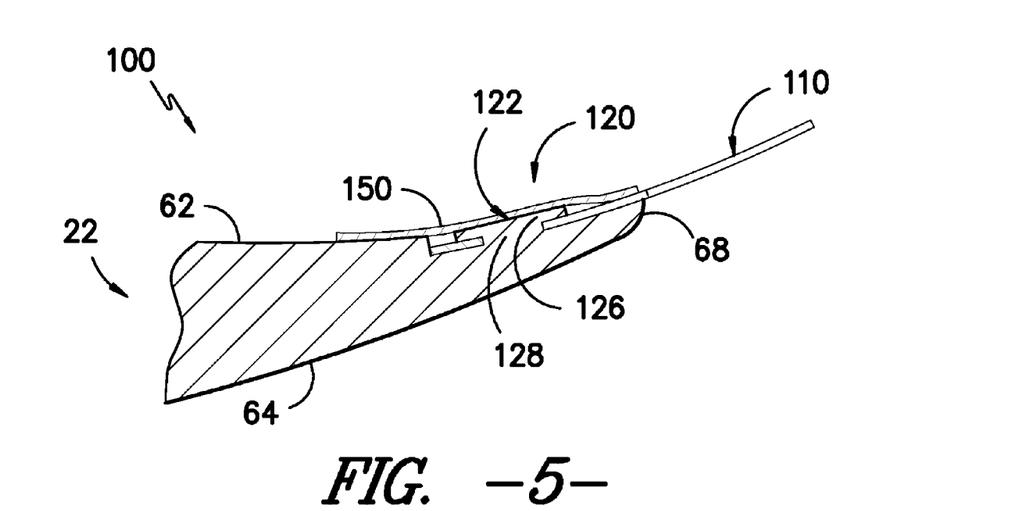
FIG. 5 is a cross-sectional view of a rotor blade, fastening device, and rotor blade component along the line 5-5 of FIG. 4 according to one embodiment of the present disclosure.

The mating grooves 124 may be configured to accept corresponding buttons 122 therein, thereby fastening the rotor blade component 110 to the rotor blade 22. In exemplary embodiments, as shown in FIGS. 3 through 5, the mating grooves 124 may have perimeters that are approximately equal to the perimeters of the stems 128. Further, the mating grooves 124 may include inlet portions 132 configured to secure the buttons 122. For example, the inlet portion 132 of a mating groove 124 may be an opening in the mating groove 124 that allows the stem 128 of a button 122 to enter and engage the mating groove 124. The inlet portion 132 may be sufficiently narrow relative to the stem 128 such that the stem 128, upon entering the mating groove 124 through the inlet portion 132, is secured in the mating groove 124.

Notably, the portions of the projections 112 that define the boundary of an inlet portion 132 may be resiliently deformable. Thus, these portions of the projections 112 may deform to allow the stem 128 to enter the mating groove 124, and may then return to their original position after the stem 128 has entered the mating groove 124, securing the stem 128 in the mating groove 124. Alternatively or additionally, the stems 128 of the buttons 122 may be resiliently deformable, to allow the buttons 122 to squeeze through the inlet portions 132 into the mating grooves 124.

It should be noted that in the exemplary embodiment as shown in FIGS. 3 through 5, the mating grooves 124 include the contouring notches 116, i.e., the contouring notches 116 also serve as mating grooves 124. Alternatively, as shown in FIGS. 6 through 10, the mating grooves 124 and contouring notches 116 are separate features of the rotor blade component 110 and fastening device 120.

In alternative exemplary embodiments, as shown in FIGS. 6 through 10, the mating grooves 124 may include a first portion 134 and a second portion 136. The first portion 134 of a mating groove 124 may be configured to accommodate the corresponding button 122, while the second portion 136 of the mating groove 124 may be configured to secure the corresponding button 122. For example, the first portion 134 of a mating groove 124 may have a perimeter approximately equal to the perimeter of the head 126 of the corresponding button 122, while the second portion 136 of the mating groove 124 may have a perimeter approximately equal to the perimeter of the stem 128 of the corresponding button 122. To fasten the rotor blade component 110 to the rotor blade 22, the buttons 122 may be placed through the first portions 134 of the mating grooves 124. The buttons 122 may then be directed from the first portions 134 to the smaller second portions 136, which may secure the stems 128 of the buttons 122.

Notably, the portions of the rotor blade component 110 or rotor blade 22 that define the boundary between the first portions 134 and the second portions 136 may be resiliently deformable. Thus, these portions may deform to allow the stem 128 to enter the second portion 136 from the first portion 134, and may then return to their original position after the stem 128 has entered the second portion 136, securing the stem 128 in the mating groove 124. Alternatively or additionally, the stems 128 of the buttons 122 may be resiliently deformable, to allow the buttons 122 to squeeze through the boundary from the first portion 134 into the second portion 126.

The buttons 122 of the present disclosure may be attached to the rotor blade 22 or rotor blade component 110 using any suitable attachment device or method. For example, the rotor blade 22 or rotor blade component 110 may be fabricated or manufactured with the buttons 122 as an integral part, or the buttons 122 may be affixed using, for example, a suitable adhesive.

Figure 6:
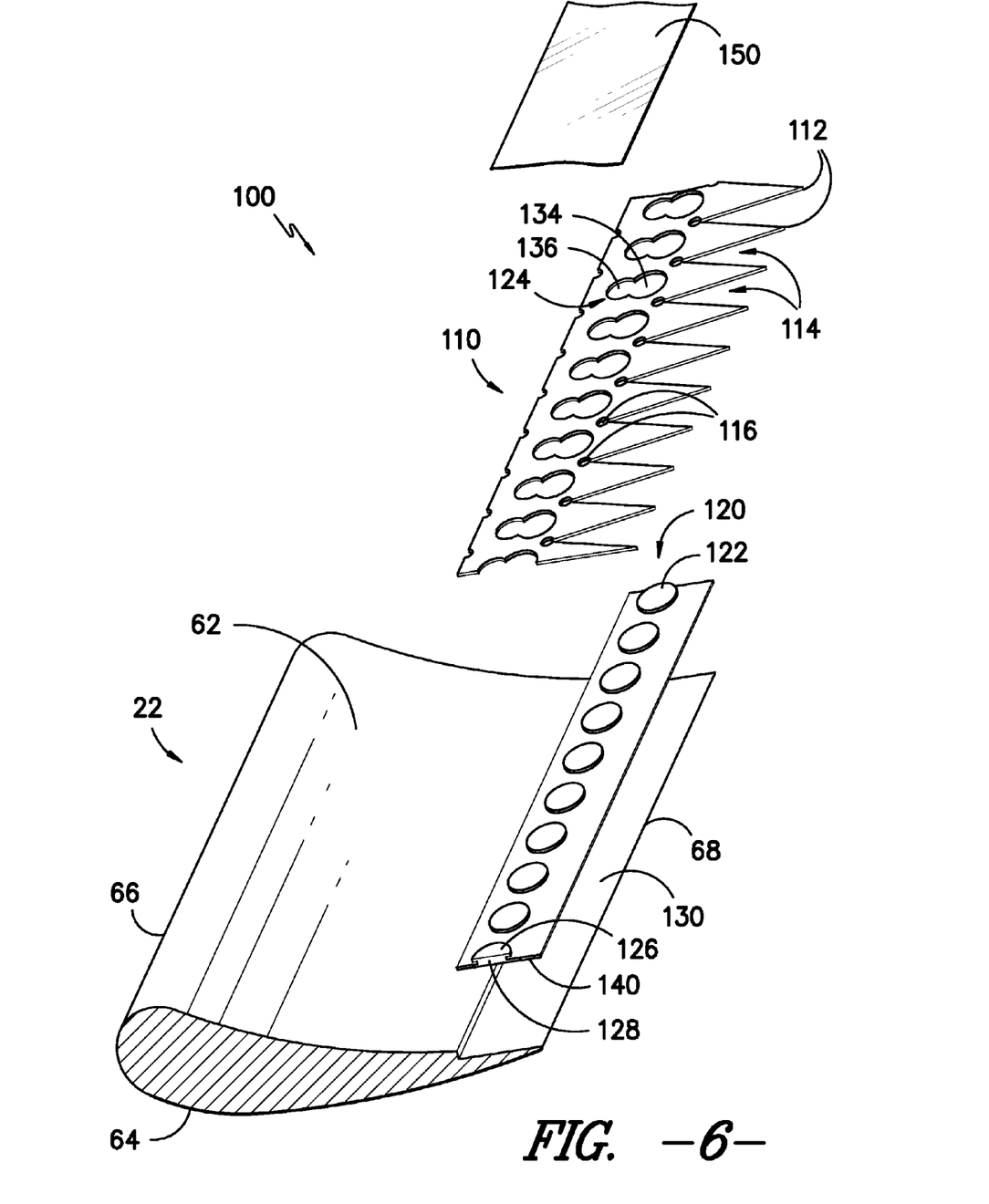
FIG. 6 is an exploded perspective view of a portion of a rotor blade, fastening device, and rotor blade component according to another embodiment of the present disclosure.
Figure 7:
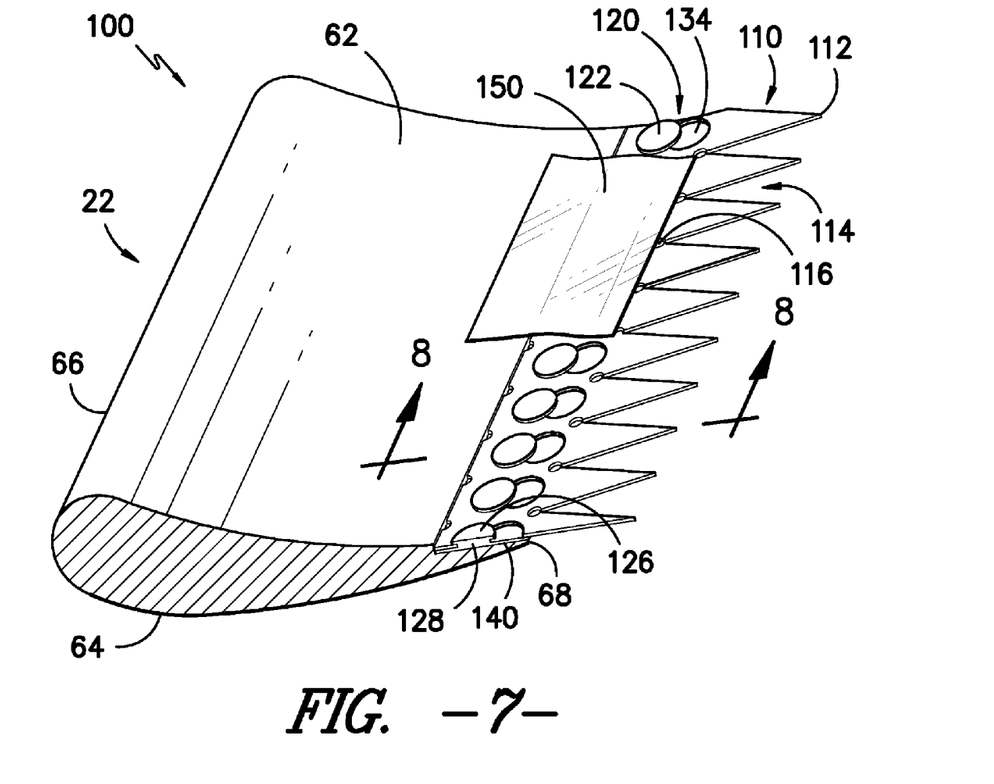
FIG. 7 is a perspective view of a portion of a rotor blade, fastening device, and rotor blade component according to another embodiment of the present disclosure.
Figure 8:
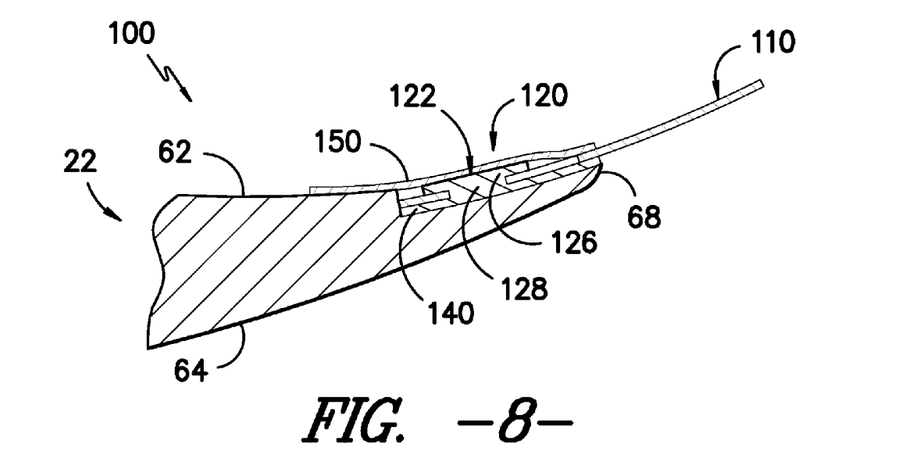
FIG. 8 is a cross-sectional view of a rotor blade, fastening device, and rotor blade component along the line 8-8 of FIG. 7 according to another embodiment of the present disclosure.

Further, in one embodiment, as shown in FIGS. 6 through 8, the buttons 122 may be attached to a mounting plate 140 using any suitable attachment device or method. Alternatively, the mating grooves 124 may be defined in the mounting plate 140. The mounting plate 140 may then be attached to the rotor blade 22 or rotor blade component 110, such as to the pressure side 62 or suction side 64, or in some embodiments to the cutaway mounting surface 130. The use of a mounting plate 140 may, in some embodiments, allow the buttons 122 or mating grooves 124 to be retrofitted to the rotor blade 22 or rotor blade component 110.

Advantageously, the configuration of the buttons 122 and the mating grooves 124 of the fastening device 120 of the present disclosure allows the rotor blade components 110 to be quickly and easily attached to and removed from rotor blades 22 as desired.

In exemplary embodiments, as shown in FIGS. 3 through 10, the rotor blade assembly 100 may further include an adhesive layer 150. The adhesive layer 150 may be affixed to the rotor blade assembly 100 proximate the fastening device 120. For example, the adhesive layer 150 may extend from the rotor blade 22 to the rotor blade component 110, covering the buttons 122 and mating grooves 124. The adhesive layer 150 may further secure the rotor blade component 110 to the rotor blade 22, and may improve the aerodynamic profile of the rotor blade 22. For example, the adhesive layer 150 may provide a relatively smooth surface, covering the fastening device 120. This relatively smooth surface may correspond to the aerodynamic profile of the rotor blade 22, and may prevent or reduce turbulence that may result from disruptions in the rotor blade 22 caused by the fastening device 120.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A rotor blade assembly, comprising:
    a rotor blade having a pressure side, a suction side, a leading edge, and a trailing edge extending between a tip and a root;
    a rotor blade component; and,
    a fastening device for fastening the rotor blade component to the rotor blade, the fastening device comprising at least one button associated with one of the rotor blade or the rotor blade component and at least one mating groove associated with the other of the rotor blade or the rotor blade component,
    wherein the at least one button and the at least one mating groove are configured to fasten the rotor blade component to the rotor blade.

2. The rotor blade assembly of claim 1, the at least one button including a head and a stem, the perimeter of the head being greater than the perimeter of the stem.

3. The rotor blade assembly of claim 2, the at least one mating groove having a perimeter approximately equal to the perimeter of the stem and including an inlet portion configured to secure the at least one button.

4. The rotor blade assembly of claim 2, the at least one mating groove including a first portion configured to accommodate the at least one button and a second portion configured to secure the at least one button, the first portion having a perimeter approximately equal to the perimeter of the head and the second portion having a perimeter approximately equal to the perimeter of the stem.

5. The rotor blade assembly of claim 1, wherein the at least one button is disposed on the rotor blade and the at least one mating groove is defined in the rotor blade component.

6. The rotor blade assembly of claim 5, the rotor blade defining a cutaway mounting surface, and wherein the at least one button is disposed on the cutaway mounting surface.

7. The rotor blade assembly of claim 5, wherein the at least one button is disposed adjacent the trailing edge.

8. The rotor blade assembly of claim 5, wherein the at least one button is disposed on the suction side.

9. The rotor blade assembly of claim 5, wherein the at least one button is disposed on the pressure side.

10. The rotor blade assembly of claim 1, wherein the at least one button is disposed on the rotor blade component and the at least one mating groove is defined in the rotor blade.

11. The rotor blade assembly of claim 1, further comprising a plurality of buttons and a plurality of mating grooves.

12. The rotor blade assembly of claim 1, wherein the rotor blade component is one of a noise reducer, a lightning receptor, a fairing, a vortex generator panel, or a boundary layer turbulator.

13. A rotor blade assembly, comprising:
    a rotor blade having a pressure side, a suction side, a leading edge, and a trailing edge extending between a tip and a root, the rotor blade further having an aerodynamic profile; and,
    a noise reducer mechanically fastened to the rotor blade adjacent the trailing edge, the noise reducer including a plurality of projections, the projections spaced apart from each other and defining a plurality of indentations therebetween, each of the plurality of indentations including a contouring notch, the contouring notches allowing the noise reducer to have an aerodynamic profile that corresponds to the aerodynamic profile of the rotor blade.

14. The rotor blade assembly of claim 13, further comprising a fastening device comprising at least one button associated with one of the rotor blade or the rotor blade component and at least one mating groove associated with the other of the rotor blade or the rotor blade component, the at least one button and the at least one mating groove configured to fasten the noise reducer to the rotor blade.

15. The rotor blade assembly of claim 14, wherein each of the mating grooves includes a contouring notch.

16. The rotor blade assembly of claim 14, the at least one button including a head and a stem, the perimeter of the head being greater than the perimeter of the stem.

17. The rotor blade assembly of claim 16, the at least one mating groove having a perimeter approximately equal to the perimeter of the stem and including an inlet portion configured to secure the at least one button.

18. The rotor blade assembly of claim 16, the at least one mating groove including a first portion configured to accommodate the at least one button and a second portion configured to secure the at least one button, the first portion having a perimeter approximately equal to the perimeter of the head and the second portion having a perimeter approximately equal to the perimeter of the stem.

19. The rotor blade assembly of claim 14, wherein the at least one button is disposed on the rotor blade and the at least one mating groove is defined in the noise reducer.

20. The rotor blade assembly of claim 14, wherein the at least one button is disposed on the noise reducer and the at least one mating groove is defined in the rotor blade.

* * * * *